United States Patent
Kukshya et al.

(10) Patent No.: US 8,902,056 B2
(45) Date of Patent: Dec. 2, 2014

(54) SCHEMES AND ALGORITHMS TO REDUCE THE ENERGY AND HARDWARE COSTS OF TIRE PRESSURE MONITORING SYSTEMS

(75) Inventors: Vikas Kukshya, Oak Park, CA (US); Hyok Jae Song, Oak Park, CA (US); Hui Pin Hsu, Northridge, CA (US); Richard W. Wiese, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 13/523,527

(22) Filed: Jun. 14, 2012

(65) Prior Publication Data
US 2013/0335216 A1 Dec. 19, 2013

(51) Int. Cl.
*B60C 23/00* (2006.01)
(52) U.S. Cl.
USPC ........... 340/445; 340/442; 340/443; 340/444; 340/446; 340/447
(58) Field of Classification Search
USPC .................................................. 340/442–447
See application file for complete search history.

(56) References Cited

U.S. PATENT DOCUMENTS

| | | | | |
|---|---|---|---|---|
| 3,950,726 A | * | 4/1976 | Fujikawa et al. | 340/447 |
| 2003/0102966 A1 | * | 6/2003 | Konchin et al. | 340/445 |

* cited by examiner

*Primary Examiner* — Daryl Pope
(74) *Attorney, Agent, or Firm* — John A. Miller; Miller IP Group, PLC

(57) ABSTRACT

A tire pressure monitoring system where the position and orientation of a receiver antenna associated with the tire pressure monitoring system is at a location that is proximate the tire pressure monitoring system. In one embodiment, the receiver antenna is positioned beneath a vehicle chassis. The location of the receiver antenna can be determined by system performance prediction tools that include mean-time-to-warning verses packet error rate curves for a desired packet error rate and packet error rate verses signal-to-noise ratio curves for various operational scenarios and different classes of vehicle that provides a necessary signal-to-noise ratio for a wireless link, and operational scenarios that established desired levels of performance and reliability.

20 Claims, 4 Drawing Sheets

SCHEMES AND ALGORITHMS TO REDUCE THE ENERGY AND HARDWARE COSTS OF TIRE PRESSURE MONITORING SYSTEMS

BACKGROUND OF THE INVENTION

1. Field of the Invention

This invention relates generally to a tire pressure monitoring system and, more particularly, to a tire pressure monitoring system that optimally positions the receiving antenna in the system to increase the performance and reduce the power required by the system.

2. Discussion of the Related Art

All new vehicles manufactured and sold in the United States are required to have a tire pressure monitoring system (TPMS) that monitors the pressure and temperature of the tires on the vehicle. Typically, the TPMS is an active system that includes its own power source, such as a battery, and a processor for processing data. The TPMS includes a suitable pressure sensor that measures the pressure within the tire and a suitable temperature sensor that measures the temperature within the tire. Sensor signals from the pressure and temperature sensors are sent to the processor, which conditions and encodes the data and the encoded signals are then modulated onto a carrier wave to be transmitted by an antenna. The signals transmitted from the TPMS are received by a receiver at a suitable location within the vehicle, where the received data is demodulated, decoded and used to determine whether a warning signal should be given that the tire pressure is too high or too low, or the tire is too hot.

In the system described above, the TPMS does not actually know if the receiver is receiving the signals it transmits. Therefore, various schemes are performed to ensure that the receiver does receive the signal, including broadcasting the tire information in redundant frames of data and at a high enough signal strength. Because of this, the battery that powers the TPMS tends to be discharged at a rate that may be higher than is necessary. When the battery becomes discharged, and the receiver is not receiving the signals, then the receiver issues a warning signal that the battery may be dead. Because of the manufacturing complexities of placing the TPMS within the tire, it is typically more cost effective to replace the tire than replace the TPMS. Therefore, an added cost may be incurred when replacing tires that may not be worn out.

Further, the performance of a TPMS is highly statistical, and is affected by many uncontrolled factors, such as vehicle speed, road surface material, occupant and cargo loading, and electro-magnetic interference (EMI) from on-board and off-board sources. Integration factors include the size of the wheel, construction of the tire, location of the receiver antenna, data encoding used, RF modulation schemes employed, transmitter battery life and different types of EMI.

In known systems, validation of the TPMS signal allows for up to two or three data packets per frame to be dropped per transmission, which gives a 50% to 60% per frame reliability. Also, as the consumer fleet matures to saturation, the ambient noise floor will increase, further degrading the over-all fleet performance. In order to ensure a desired packet error rate (PER), it is necessary to provide a reliable communications link between the TPMS and the receiver, which may include increasing the transmit power. Alternatively, the number of frames in the packet can be increased so that the redundancy of the data in each packet is increased. Therefore, if part of the packet is lost, there is still a good chance that the information in the packet can be deciphered by the receiver. It is also possible to increase the number of packets that are transmitted to better ensure that the receiver receives the information. However, an increase in the number of packet transmissions also increases the power and consumption.

Further, the antenna associated with the receiver is typically part of the receiver unit and is located therewith. The receiver may be in the vehicle trunk or other locations where it is behind vehicle structures, including metal body structures that are part of the vehicle. Thus, signals from the TPMS may be attenuated or prevented from reaching the antenna of the receiver depending on its location.

SUMMARY OF THE INVENTION

In accordance with the teachings of the present invention, a tire pressure monitoring system is disclosed where the position and orientation of a receiver antenna associated with the tire pressure monitoring system is at a location that is proximate the tire pressure monitoring system. In one embodiment, the receiver antenna is positioned beneath a vehicle chassis. The location of the receiver antenna can be determined by system performance prediction tools that include mean-time-to-warning verses packet error rate curves for a desired packet error rate and packet error rate verses signal-to-noise ratio curves for various operational scenarios and different classes of vehicle that provides a necessary signal-to-noise ratio for a wireless link, and operational scenarios that established desired levels of performance and reliability.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a tire pressure monitoring system is merely exemplary in nature and is in no way intended to limit the invention or its applications or uses.

Figure 1:
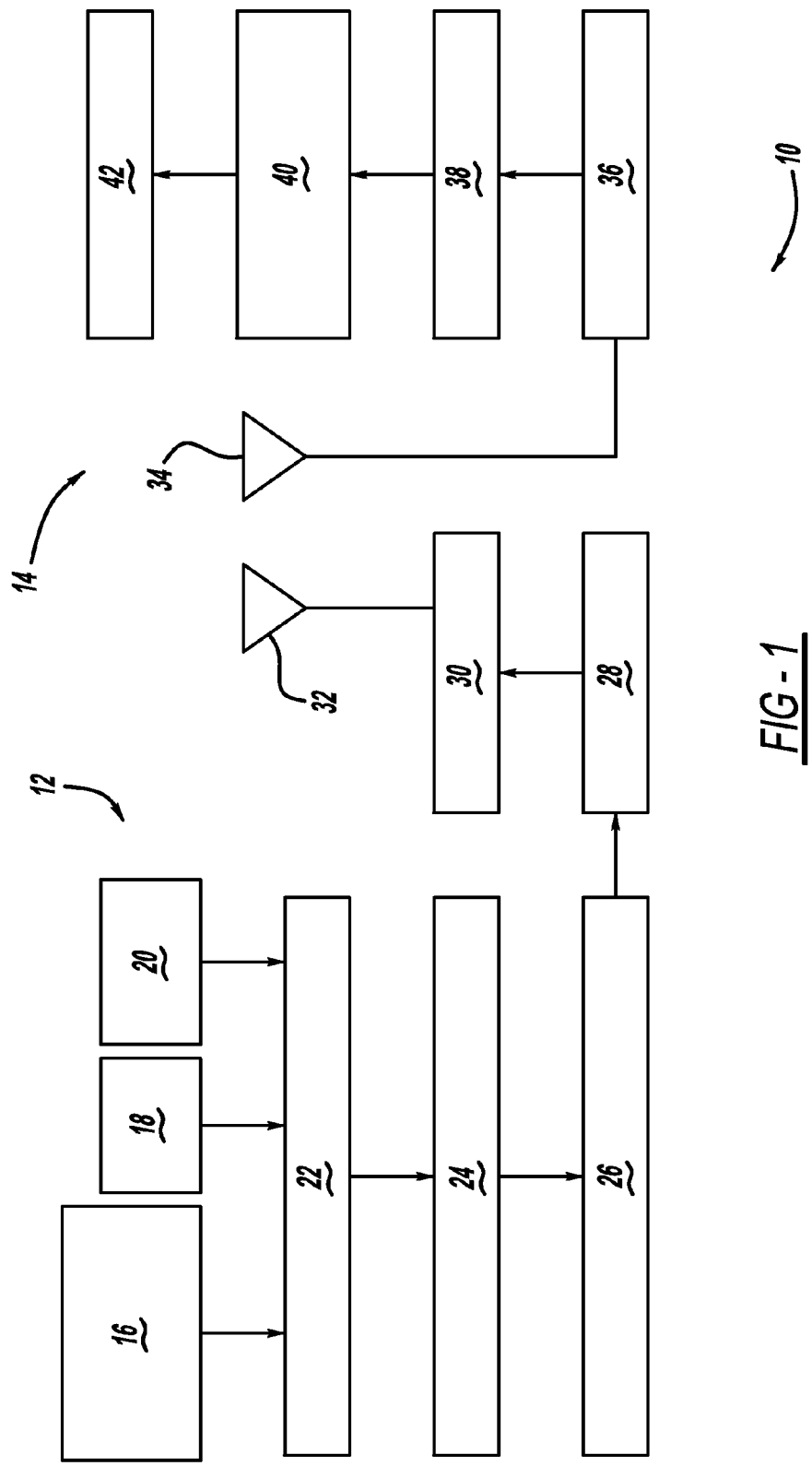
FIG. 1 is a schematic block diagram of a tire pressure monitoring system (TPMS)

FIG. 1 is a schematic block diagram of a TPMS 10 including a tire pressure sub-system 12 and a receiver sub-system 14. The tire pressure sub-system 12 is located within the vehicle tire and includes pressure and temperature sensors 16 that provide temperature and pressure measurement signals. Further, a tire identification number (ID) identifying a particular tire is provided at box 18 and a battery 20 provides battery power for the sub-system 12. The pressure and temperature sensors 16 in the tire provide measurement signals to a signal conditioning processor 22 that conditions the signals. The conditioned signals are sent to a data frame generation processor 24 where the data frames are generated, and the data frames are sent to a data packet generation processor 26 where they are modulated onto a carrier wave by modulator 28, up-converted by an up-conversion circuit 30 and transmitted by an antenna 32. The transmitted signals from the antenna 32 are received by an antenna 34 in the receiver sub-system 14 where they are down-converted by a down-conversion circuit 36. The down-converted signals are demodulated by a demodulator 38 to remove the carrier wave and the separated data frames are sent to a microcontroller 40 that processes the data that was transmitted. The information can be displayed on a display 42.

Figure 2:
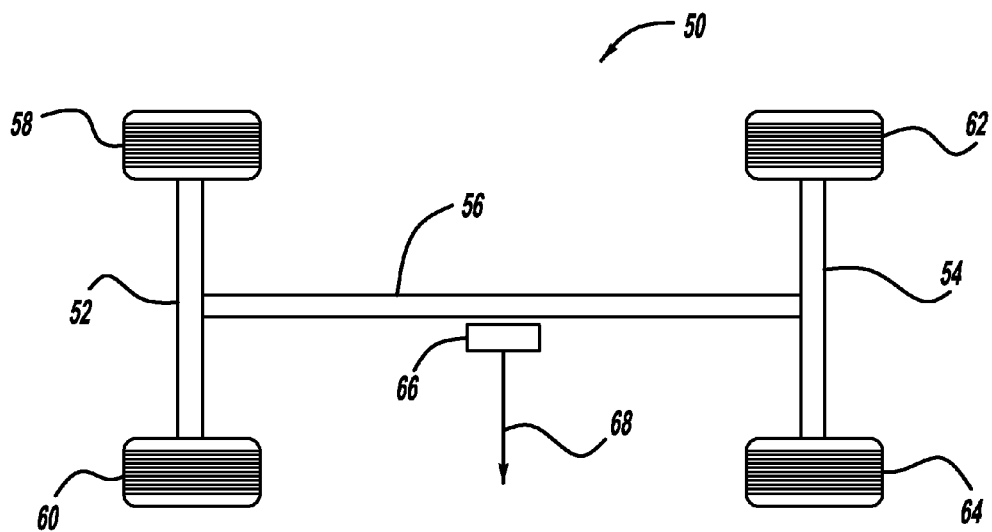
FIG. 2 is a plan view of a vehicle chassis and tires showing an antenna for the receiver sub-system of the TPMS shown in FIG. 1.

FIG. 2 is a simplified plan view of a vehicle chassis 50 including a front axle 52, a rear axle 54 and a cross-bar 56 therebetween. A right front tire 58 and a left front tire 60 are coupled to the front axle 52 and a right rear tire 62 and a left rear tire 64 are coupled to the rear axle 54. In this embodiment, a receiver antenna 66, representing the antenna 34, is coupled to the chassis 50 at a suitable location consistent with the discussion herein, such as on or beneath the cross-bar 56. The antenna 66 is coupled to the receiver (not shown) by a cable 68, where the receiver can be at any desirable location on the vehicle.

The location of the antenna 66 is selected so that it easily receives the transmissions from the antenna 32 in each of the tires 58, 60, 62 and 64. The position of the antenna 66 has a strong impact on the overall performance of the system 10. Typically, in known systems, the antenna and the receiver sub-system of a TPMS are imbedded deep inside the instrument panel or the trunk of the vehicle, and consequently suffer from less than ideal performance due to excessive wireless-signal path loss and vehicular EMI. In the absence of any performance margin in the link budget, the system must rely on a high level of redundancy to achieve the desired levels of performance and reliability. By optimally positioning the antenna 66 below the chassis 50 of the vehicle, the wireless-signal-path loss is reduced, and the impact of EMI originating from electronic components, wireless sensors and hybrid/electric power-train technologies is reduced.

Simulation results from the position of the antenna 66 indicated that on average the path loss experienced by the wireless signals from various tires of a vehicle is 15 dB lower than when the antenna 66 is placed under the chassis 50 of the vehicle rather than on the rear windshield of the vehicle. In the link budget equation of the TPMS 10, even if an additional loss of 3 dB is accounted for as a result of the extended cable 68 connecting the receiver antenna with the receiver sub-system 14, an additional performance margin of about 10 dB can be achieved. During normal operational conditions, a part of this performance margin can be used to improve the packet error rate (PER) of the TPMS 10 to achieve desired levels of reliability, some can be used to reduce the level of redundancy in the system, such as the number of frames per packet, the number of packets per unit of time, etc., and the rest of the performance margin can be used to reduce the transmit power-level of each of the tire pressure sub-systems in the vehicle tires. Also, during adverse operating conditions, especially in the presence of high levels of inter-vehicular EMI, the entire performance margin can be used to boost the PER performance to prevent loss of any data packets.

Figure 3:
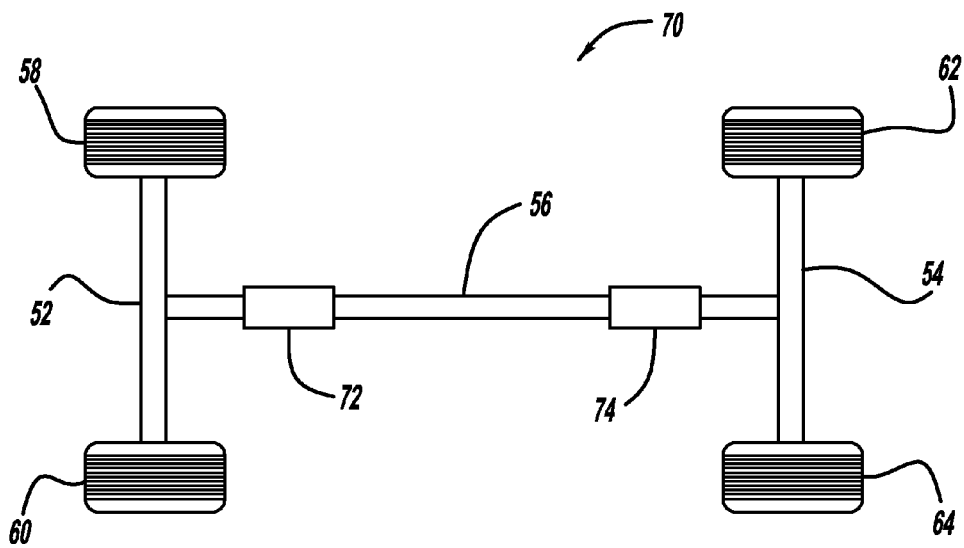
FIG. 3 is a plan view of a vehicle chassis and four vehicle tires showing two receiver antennas for the receiver sub-system shown in FIG. 1.

The location of the antenna 66 can be different in different systems. FIG. 3 is a plan view of a vehicle chassis 70, similar to the chassis 50, where like elements are identified by the same reference numeral. In this embodiment, the antenna 66 is replaced with two antennas 72 and 74, where the antenna 72 is placed under the chassis 70 near the front axle 52 and the antenna 74 is placed under the chassis 70 near the rear axle 54. In this architecture, the tire pressure sub-system in the right front tire 58 and the tire pressure sub-system in the left front tire 60 transmit to the antenna 72 and the tire pressure sub-system in the rear tires 62 and 64 transmit to the antenna 74. The antennas 72 and 74 have a common cable (not shown) feeding the receiver sub-system. Simulation results for this embodiment indicate that it may be possible to extract a performance margin of about 20 dB using the typical TPMS hardware.

Figure 4:
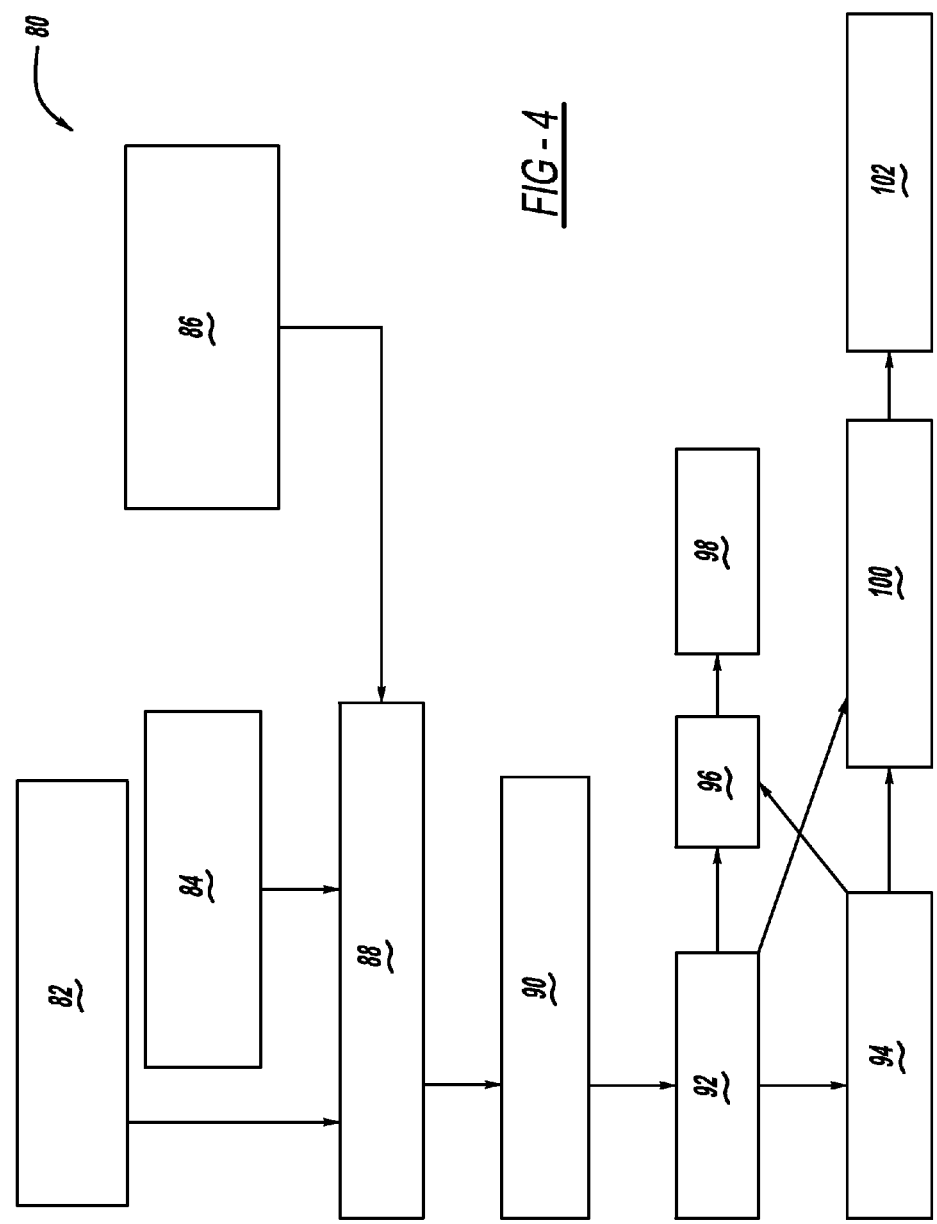
FIG. 4 is a flow chart diagram showing a process for minimizing system redundancy and signal transmission power.

FIG. 4 is a flow chart diagram 80 showing a process for an algorithm that minimizes TPMS redundancy and signal transmission. A database is created using TPMS performance prediction tools that generates mean-time-to-warning verses PER curves for various operational scenarios and different classes of vehicles at box 82 for the desired packet error rate that needs to be achieved for the TPMS. The performance prediction tool also provides PER verses signal-to-noise ratio (SNR) curves for various operational scenarios and different classes of vehicles at box 84 that gives the necessary SNR for the wireless link for that particular vehicle. Further, the algorithm identifies the operational scenarios and establishes desired levels of performance and reliability for each of the tire pressure sub-systems in the vehicle tires at box 86. The mean-time-to-warning verses PER curves, the PER verses SNR curves and the performance and reliability levels are then used to estimate the SNR required for desired levels of performance and reliability at box 88. Using the estimated SNR, the desired performance margin can be calculated for each tire pressure sub-system in each vehicle tire in dBs at box 90. Once the performance margin is known, then that value can be used to minimize packet redundancy transmitted at box 92 and minimize signal transmission power at box 94, both of which save energy at box 96 to increase battery life at box 98 and reduce levels of intra and inter-vehicle EMI at box 100, which provides better PER performance and system reliability at box 102.

The algorithm shown by the flow chart diagram 80 can be used to trade-off any performance margin in the link budget of the TPMS to minimize redundancy in the system and increase battery life, while maintaining desired levels of system reliability. For example, assume that for a given operational scenario and a given class of vehicles, the PER value required to maintain the desired level of TPMS reliability, i.e., mean-time-to-warning of the days, as suggested by the mean-time-to-warning verses PER curves generated by the TPMS performance prediction tool is P1. In the next step the PER verses SNR curves are used, either generated by the TPMS performance prediction tool or retrieved from a pre-existing database for the given operation scenario, to estimate the SNR value required to maintain the desired PER value of P1.

A half-duplex TPMS architecture enables the tire pressure sub-system and the receiver sub-system to sense operational conditions outside and inside the vehicle, reconfigure software and hardware system parameters in real-time in order to adapt to changes in operational conditions, and provide feedback on the real-time performance of the system. In those cases where it might not be feasible to employ one or more receiving antennas below the chassis of the vehicle, a simple wireless signal-networking technique can be used to minimize system redundancy, save energy and provide lower levels of inter-vehicular EMI by reducing wireless-signal collisions.

Figure 5:
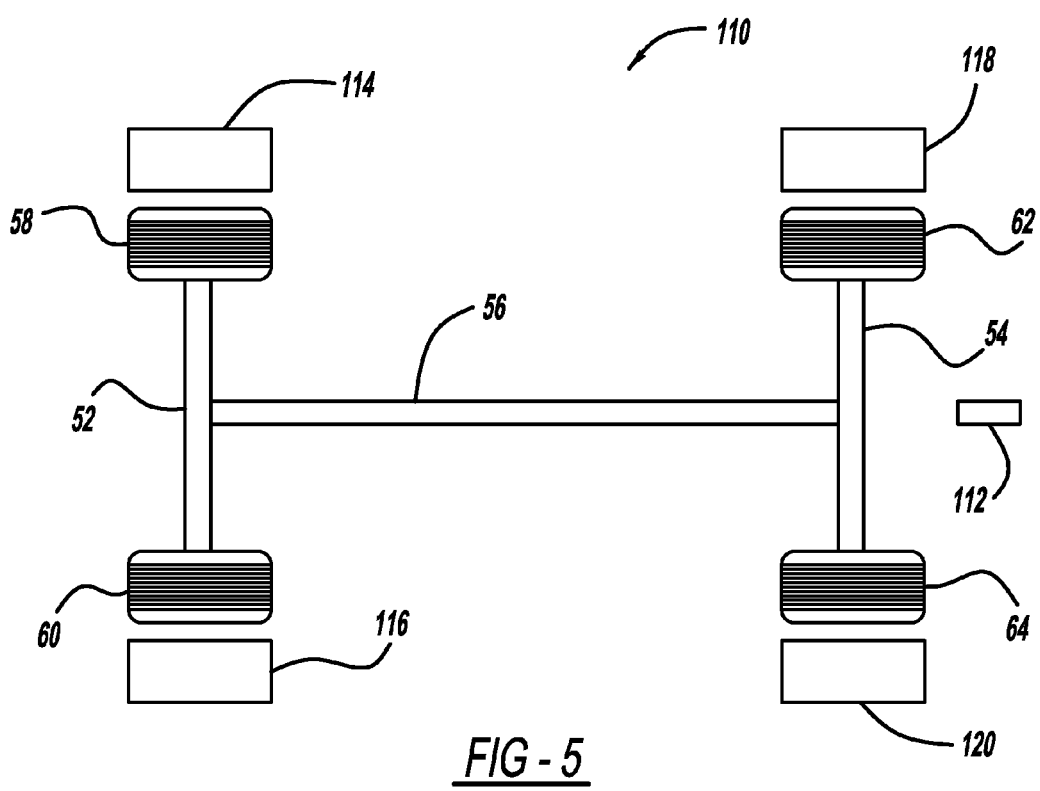
FIG. 5 is a simplified plan view of a vehicle chassis and vehicle tires.

FIG. 5 is a plan view of an architecture 110 showing one such design, where like elements to the designs above are identified by the same reference numeral. In the architecture 110, the receiver sub-system antenna 112 is remote from the tires 58-64. The architecture 110 includes a box that represents the tire pressure sub-system (TPS) in each of the tires 58-64, namely, TPS 114, TPS 116, TPS 118 and TPS 120, respectively. In this architecture, one or more of the TPSs 114-120 can both transmit and receive signals. One TPS 114-120 broadcasts information at very low transmit-power levels to the other TPSs 114-120 rather than at a maximum low transmit power to the receiving antenna 112, so that each TPS 114-120 collects data packets from all of the other TPSs 114-120, and then only the TPS 114-120 nearest to the receiving antenna 112 transmits all of the data packets to the antenna 112 from all of the TPSs 114-120. This TPS can decide to transmit the collected information to the receiving antenna 112 using a default communications scheme, i.e., data encoding scheme, modulation scheme, number of frames per packet, number of packets per time unit, etc., or use a different scheme to ensure high transmission reliability.

In this type of design, one of the tires 58-64 can be designated the collecting tire, which receives the data from the other tires and transmits the data from all the tires to the antenna 112. In this situation, only that TPS 114-120 would need to be able to receive. Alternately, it may be desirable to allow all of the TPSs 114-120 to receive so that different ones of the TPSs 114-120 can be the one that collects the data from the others and transmit it to the antenna 112. In this design, if one of the tires is replaced where a new TPS is provided with greater battery power, it can be designated the one that transmits the information to the antenna 112, which may be a longer distance and require more power.

A scheme can be devised to share the responsibility of transmitting the collected information among all of the TPSs 114-120 so that the energy load balances on the batteries of all the TPSs. In this design, assume that the maximum allowed power level of each of the TPSs 114-120 of a given vehicle is T dBm and that when each TPS 114-120 transmits at its maximum transmit power level, the corresponding received signal power level at the receiving power levels are $R_1$ dBm, $R_2$ dBm, $R_3$ dBm and $R_4$ dBm. Now assume that within a given interval of time corresponding to a total of M transmissions, the number of times each of the TPSs 114-120 must assume the responsibility of transmitting the collected information to the receiving antenna is $N_1$, $N_2$, $N_3$ and $N_4$, respectively, where:

$$N_1+N_2+N_3+N_4=N \quad (1)$$

To balance the energy load on the batteries of the TPSs 114-120, equation (2) below must be satisfied.

$$N_1 \times 10^{\frac{T-R_1}{10}} = N_2 \times 10^{\frac{T-R_2}{10}} \quad (2)$$
$$= N_3 \times 10^{\frac{T-R_3}{10}}$$
$$= N_4 \times 10^{(T-R_4)/10}$$

Now, considering that $N_2$, $N_3$ and $N_4$ can be expressed in terms of $N_1$ as $N_1 \times 10^{(R_2-R_1)/10}$, $N_1 \times 10^{(R_3-R_1)/10}$, and $N_1 \times 10^{(R_4-R_1)/10}$, respectively, these values can be substituted into equation (1) to calculate their values as follows:

$$N_i N/10^{(R_1-R_i)/10}+10^{(R_2-R_i)/10}+10^{(R_3-R_i)/10}+10^{(R_4-R_i)/10} \quad (3)$$

So, for example, if N=100 total number of transmissions, and the average R1, R2, R3 and R4 values for the right front (RF), left front (LF), right rear (RR), and left rear (LR) tires of a vehicle are −55.2 dBm, −49.6 dBm, −60.2 dB and −63.6 dBm, respectively, then according to the algorithm in FIG. 4, in order to balance the energy load on the respective batteries, the TPSs in the RF, LF, RR and LR tires of the vehicle should be assigned the responsibility of transmitting the collective information 20, 71, 6 and 3 times, respectively.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tire pressure monitoring system for a vehicle having a plurality of tires, said system comprising:
a plurality of tire pressure sub-systems where a separate tire pressure sub-system is provided in each tire, and where each tire pressure sub-system transmits data concerning the pressure in the tire; and
a receiving sub-system including at least one receiving antenna, said receiving antenna being positioned proximate a vehicle chassis and the vehicle tires, wherein the at least one receiving antenna is positioned proximate to the vehicle chassis at a location determined by system performance prediction tools that include mean-time-to-warning verses packet error rate curves for various operating scenarios and different classes of vehicles for a desired packet error rate, packet error rate verses signal-to-noise ratio curves for various operational scenarios and different classes of vehicle that provides a necessary signal-to-noise ratio for a wireless link, and operational scenarios that established desired levels of performance and reliability.

2. The system according to claim 1 wherein the at least one receiving antenna is positioned beneath the vehicle chassis.

3. The system according to claim 1 wherein the at least one receiving antenna is positioned beneath a cross-bar coupling front and rear axles of the chassis.

4. The system according to claim 1 wherein the at least one receiving antenna is two receiving antennas where a first one of the receiving antennas is positioned proximate a front axle of the vehicle chassis and a second one of the receiving antennas is positioned proximate a rear axle of the vehicle chassis.

5. The system according to claim 4 wherein the first and second antennas are coupled to a common cable that is coupled to a receiver in the receiving sub-system.

6. The system according to claim 1 wherein the receiving sub-system includes a receiver and wherein the at least one receiving antenna is positioned at a different location than the receiver.

7. The system according to claim 1 wherein the tire pressure sub-systems include both pressure sensors and temperature sensors that measure pressure and temperature that are provided as part of the data.

8. The system according to claim 1 wherein the mean-time-to-warning verses packet error rate curves, the packet error rate verses signal-to-noise rate curves and the performance and reliability levels are used to estimate the signal-to-noise ratio required for desired levels of performance and reliability to determine the desired performance margin for each tire pressure sub-system, which is then used to minimize packet redundancy and minimize signal transmission power.

9. The system according to claim 1 wherein the plurality of tire pressure sub-systems are designed so that one of the tire pressure sub-systems is designated a transmission tire pressure sub-system where the other tire pressure sub-systems transmit data to the transmission tire sub-system and the transmission tire sub-system transmits data from all of the tires to the at least one receiving antenna.

10. A tire pressure monitoring system for a vehicle having a plurality of tires, said system comprising:
a plurality of tire pressure sub-systems where a separate tire pressure sub-system is provided in each tire and where each tire pressure sub-system transmits data concerning the pressure in the tire; and
a receiving sub-system including at least one receiving antenna, said receiving antenna being positioned at a location relative to the vehicle tires determined by system performance prediction tools that include mean-time-to-warning verses packet error rate curves for various operating scenarios and different classes of vehicles for a desired packet error rate, packet error rate verses signal-to-noise ratio curves for various operational scenarios and different classes of vehicle that provides a necessary signal-to-noise ratio for a wireless link, and operational scenarios that established desired levels of performance and reliability.

11. The system according to claim 10 wherein the mean-time-to-warning verses packet error rate curves, the packet error rate verses signal-to-noise rate curves and the performance and reliability levels are used to estimate the signal-to-noise required for desired levels of performance and reliability to determine the desired performance margin for each tire pressure sub-system, which is then used to minimize packet redundancy and minimize signal transmission power.

12. The system according to claim 10 wherein the at least one receiving antenna is positioned beneath the vehicle chassis.

13. The system according to claim 10 wherein the at least one receiving antenna is positioned beneath a cross-bar coupling front and rear axles of the chassis.

14. The system according to claim 10 wherein the at least one receiving antenna is two receiving antennas where a first one of the receiving antennas is positioned proximate a front axle of the vehicle chassis and a second one of the receiving antennas is positioned proximate a rear axle of the vehicle chassis.

15. The system according to claim 10 wherein the receiving sub-system includes a receiver and wherein the at least one receiving antenna is positioned at a different location than the receiver.

16. A tire pressure monitoring system for a vehicle having a plurality of tires, said system comprising:
a plurality of tire pressure sub-systems where a separate tire pressure sub-system is provided in each tire, and where each tire pressure sub-system transmits data concerning the pressure in the tire; and
a receiving sub-system including at least one receiving antenna, wherein the plurality of tire pressure sub-systems are designed so that one of the tire pressure sub-systems is designated a transmission tire pressure sub-system where the other tire pressure sub-systems transmit data to the transmission tire sub-system and the transmission tire sub-system transmits data from all of the tires to the at least one receiving antenna.

17. The system according to claim 16 wherein the at least one receiving antenna is positioned beneath the vehicle chassis.

18. The system according to claim 16 wherein the at least one receiving antenna is positioned beneath a cross-bar coupling front and rear axles of the chassis.

19. The system according to claim 16 wherein the at least one receiving antenna is two receiving antennas where a first one of the receiving antennas is positioned proximate a front axle of the vehicle chassis and a second one of the receiving antennas is positioned proximate a rear axle of the vehicle chassis.

20. A tire pressure monitoring system for a vehicle having a plurality of tires, said system comprising:
a plurality of tire pressure sub-systems where a separate tire pressure sub-system is provided in each tire, and where each tire pressure sub-system transmits data concerning the pressure in the tire; and
a receiving sub-system including at least one receiving antenna, said receiving antenna being positioned proximate a vehicle chassis and the vehicle tires, wherein the plurality of tire pressure sub-systems are designed so that one of the tire pressure sub-systems is designated a transmission tire pressure sub-system where the other tire pressure sub-systems transmit data to the transmission tire sub-system and the transmission tire sub-system transmits data from all of the tires to the at least one receiving antenna.

* * * * *